METHOD OF PRODUCTION OF SYNTHETIC FLUORITE HAVING A SELECTED GRAIN SIZE

This invention relates to a method of production of synthetic fluorite — calcium fluoride — having a selected predetermined grain size within the grain size range from 1 micrometer to several score millimeters. Said fluorite is applicable for many purposes in the chemical industry and in metallurgy.

There is known a method of production of synthetic fluorite by the reaction of ammonium fluoride with calcium carbonate according to the formula:

$$2 NH_4F + CaCO_3 = CaF_2 + (NH_4)_2CO_3$$

In this process a solution of ammonium fluoride obtained from the hydrolysis of fluosilicic acid is used.

There is also known the synthetic preparation of calcium fluoride by the reaction of calcium carbonate with sodium fluoride and potassium fluoride:

$$2 NaF + CaCO_3 = CaF_2 + Na_2CO_3$$

$$2 KF + CaCO_3 = CaF_2 + K_2CO_3$$

In all said reactions calcium carbonate was used, with very fine grain size, due to its higher reactivity. It was assumed thereby that the reaction occurs exclusively on the surface of the calcium carbonate grains with separation of the crystalline phase of the product from the crystalline phase of the parent substance. In all known processes synthetic fluorite is produced, showing a significant dispersion, and being characterized by bad filtering ability. For this reason the production thereof is difficult from a technical point of view, and the application of a fine-size grained product is limited.

In the course of investigations of the conversion of calcium carbonate with ammonium fluoride, sodium fluoride or potassium fluoride using the reaction of a solution containing one, two or three of said salts, it was unexpectedly found that the produced calcium fluoride — synthetic fluorite — may be produced with a selected grain size, and even in the form of pieces. The grain size of the fluorite depends on the grain size of the calcium carbonate used in the reaction, whereby in the produced fluorite the size and shape of the grains of the calcium carbonate are reproduced. Even such an unexpected process of conversion of the calcium carbonate into the fluorite can be explained — in the light of the investigations carried out to explain that phenomenon — by the reduction of the volume of the crystalline phase in the course of the conversion, and by forming therefore free spaces in the grains where movements of the carbonate and fluoride ions occur.

The method, according to the invention, of production of synthetic fluorite with a a selected grain size, by submitting the calcium carbonate to a reaction with fluoride ions present in an aqueous solution, consists therein that calcium carbonate is used having a specific grain size, such as predetermined for the fluoride to be synthetically prepared. The fluoride ions for the reaction with calcium carbonate are used in the form of a solution of ammonium fluoride and/or potassium fluoride and/or sodium fluoride.

The process is conducted at a temperature chosen within the range of 50° C to 150° C, under a reduced, atmospheric, or elevated pressure within the range of 0.5 to 10 atm. A mixing is applied of the calcium carbonate grains with a solution containing fluoride ions, preferably not too intensive mixing, or the solution containing the fluoride ions is passed through a bed of calcium carbonate grains. In both cases it is preferable to conduct the reaction in counter-current stream of the reactants. It is also preferable to conduct the process at the boiling point or at a temperature lying not significantly far from the boiling point, especially in a reaction system containing ammonium fluoride.

In some cases it is advantageous to introduce an industrial gas containing silicon tetrafluoride and/or hydrogen fluoride directly into the system containing the calcium carbonate, and a solution containing ammonia and/or ammonium carbonate and/or potassium carbonate and/or sodium carbonate and to separate the obtained post-reaction suspension with isolation of the synthetic fluorite, the silica and of the solution of the ammonium carbonate and/or sodium carbonate and/or potassium carbonate, which are than returned to the process.

The method according to the invention renders it possible to obtain synthetic fluorite with a very small content of the calcium carbonate, with almost complete passing of the fluorite from the solution into the crystalline phase. The substantial advantage of the method according to the invention is also the fact that in the reaction a solution of fluoride can be used, containing silica suspended therein, as the silica obtained from the silicon tetrafluoride can be easy separated from the coarse-grained fluorite, insuring the product purity.

EXAMPLES

The mineral calcium carbonate used in the reaction had a small amount of impurities with respect to the quality of fluorite obtained therefrom.

In the reaction mineral calcium carbonate was used, containing 98 – 98.5% $CaCO_3$ and 0.3 – 0.7% $SiO_2$, and being moreover contaminated with magnesium carbonate and aluminum and iron compounds.

Calcium carbonate was used, having different, determined grain sizes within the range of 1 μm to 20 mm.

For the reaction with calcium carbonate solutions of ammonium fluoride and potassium fluoride were used. A high grade solution of ammonium fluoride and potassium fluoride was used, obtained by ammonia hydrolysis of potassium fluosilicate, which in the reaction with the calcium carbonate gives, besides the fluorite, a solution of potassium carbonate.

EXAMPLE 1

Calcium carbonate with a grain sized of 1 – 20 μm, used in the amount of 100 g, was heated for 5 hours at a temperature of 50° – 70° C with a solution of ammonium fluoride, containing 222 g $NH_4F$ in 1 liter (6 mol/l), used in the amount of 340 ml.

A reaction mixture was obtained containing in 1 liter about 5 g of ammonium fluoride and fluorite with grain size of 1 – 20 μm, containing about 3% of calcium carbonate.

EXAMPLE 2

Calcium carbonate with a grain size of 0.2 – 0.4 mm, used in the amount of 100 g, was heated for 2 hours at a temperature of 95° – 98° C with a solution of ammonium fluoride, containing 222 g of $NH_4F$ in 1 liter, used in amount of 340 ml.

United States Patent [19]

Augustyn et al.

[11] 4,093,706

[45] June 6, 1978

[54] METHOD OF PRODUCTION OF SYNTHETIC FLUORITE HAVING A SELECTED GRAIN SIZE

[75] Inventors: Władysław Augustyn; Maria Dzięgielewska, both of Gliwice; Andrzej Kossuth, Katowice, all of Poland

[73] Assignees: Politechnika Slaska; Instytut Chemii Nieorganicznej, both of Gliwice, Poland

[21] Appl. No.: 734,594

[22] Filed: Oct. 21, 1976

[30] Foreign Application Priority Data

Nov. 13, 1975 Poland .................................. 184737

[51] Int. Cl.² ............................................. C01F 11/22
[52] U.S. Cl. ................................. 423/490; 423/420; 423/421; 423/335
[58] Field of Search ................ 423/490, 420, 421, 335

[56] References Cited

U.S. PATENT DOCUMENTS

| 2,573,704 | 11/1951 | Gilbert et al. | 423/490 X |
| 3,357,788 | 12/1967 | Ross | 423/490 |

FOREIGN PATENT DOCUMENTS

| 219,971 | 10/1925 | United Kingdom | 423/421 |
| 904,882 | 9/1962 | United Kingdom | 423/490 |

*Primary Examiner*—Edward Stern
*Attorney, Agent, or Firm*—Haseltine, Lake & Waters

[57] ABSTRACT

Method of production of synthetic fluorite with a selected specified grain size to be obtained, by submitting the calcium carbonate to a reaction with fluoride ions present in an aqueous solution, consists therein that calcium carbonate is used having a grain size substantially the same as the selected grain size for the synthetic fluorite to be obtained. The fluoride ions for the reaction with the calcium carbonate are supplied in the form of a solution of ammonium fluoride and/or potassium fluoride and/or sodium fluoride. The process is conducted at a temperature chosen within the range of 50° C to 150° C, under a pressure reduced, atmospheric or elevated, within the range of 0.5 to 10 atm, and preferably at the boiling temperature or at a temperature not too far from the boiling point, especially in a reaction system containing ammonium fluoride. The process is conducted by mixing the calcium carbonate grains with a solution containing fluoride ions, or by passing the solution containing the fluoride ions through a bed of grains containing the calcium carbonate. In both cases it is preferable to conduct the process by counter-current displacement of the reaction agents.

14 Claims, No Drawings group consisting of silicon tetrafluoride, hydrogen fluoride and mixtures thereof into a system comprising the calcium carbonate and a solution of a compound selected from the group consisting of ammonia, ammonium carbonate, potassium carbonate and sodium carbonate.

9. The method of claim 8 wherein the gas comprises silicon tetrafluoride and the reaction product comprises a suspension of silica and the fluorite in a solution of ammonium, potassium or sodium carbonate and wherein the silica is separated from the fluorite grains and the carbonate solution from the reaction product is recycled.

10. The method of claim 6 wherein the fluoride solution is formed in situ by passing a gas selected from the group consisting of silicon tetrafluoride, hydrogen fluoride and mixtures thereof into a system comprising the calcium carbonate and a solution of a compound selected from the group consisting of ammonia, ammonium carbonate, potassium carbonate and sodium carbonate.

11. The method of claim 10 wherein the gas comprises silicon tetrafluoride and the reaction product comprises a suspension of silica and the fluorite in a solution of ammonium, potassium or sodium carbonate and wherein the silica is separated from the fluorite grains and the carbonate from the reaction product is recycled.

12. The method of claim 1 wherein the calcium carbonate has a grain size of 0.2–0.4 mm.

13. The method of claim 1 wherein the calcium carbonate has a grain size of 8–20 mm.

14. The method of claim 1 wherein the calcium carbonate has a grain size of 0.7 to 1.1 mm.

* * * * *